United States Patent
Mattioli et al.

(10) Patent No.: US 12,030,681 B2
(45) Date of Patent: Jul. 9, 2024

(54) FEEDING UNIT FOR FEEDING SEALED SEMI-FINISHED PACKS CONTAINING A POURABLE PRODUCT TO A FOLDING UNIT

(71) Applicant: Tetra Laval Holdings & Finance S.A., Pully (CH)

(72) Inventors: Giorgio Mattioli, Modena (IT); Gabriele Borasi, Spilamberto (IT); Enrico Berselli, Modena (IT)

(73) Assignee: Tetra Laval Holdings & Finance S.A., Pully (CH)

( * ) Notice: Subject to any disclaimer, the term of this patent is extended or adjusted under 35 U.S.C. 154(b) by 172 days.

(21) Appl. No.: 17/636,992

(22) PCT Filed: Sep. 30, 2020

(86) PCT No.: PCT/EP2020/077332
§ 371 (c)(1),
(2) Date: Feb. 21, 2022

(87) PCT Pub. No.: WO2021/069274
PCT Pub. Date: Apr. 15, 2021

(65) Prior Publication Data
US 2022/0355960 A1 Nov. 10, 2022

(30) Foreign Application Priority Data
Oct. 7, 2019 (EP) .................................... 19201610

(51) Int. Cl.
B65G 47/84 (2006.01)
B65B 35/10 (2006.01)
B65G 33/06 (2006.01)

(52) U.S. Cl.
CPC .............. B65B 35/10 (2013.01); B65G 33/06 (2013.01); B65G 47/841 (2013.01)

(58) Field of Classification Search
CPC ......... B65B 35/00; B65B 35/10; B65B 35/20; B65B 35/205; B65B 35/22; B65B 35/24;
(Continued)

(56) References Cited

U.S. PATENT DOCUMENTS 2,604,200 A * 7/1952 Hohl ...................... B65G 33/04
198/402
2,829,757 A * 4/1958 Breeback ............. B65G 47/681
198/612
(Continued)

FOREIGN PATENT DOCUMENTS

| CN | 103635391 A | 3/2014 |
| CN | 103635394 A | 3/2014 |

(Continued)

OTHER PUBLICATIONS

International Search Report mailed Dec. 1, 2020, for priority International Patent Application No. PCT/EP2020/077332.
(Continued)

*Primary Examiner* — Joshua G Kotis
(74) *Attorney, Agent, or Firm* — Renner, Otto, Boisselle & Sklar, LLP

(57) ABSTRACT

A feeding unit configured to feed semi-finished sealed packs containing a pourable product to a folding unit adapted to fold the packs so as to obtain folded packages, the feeding unit comprises: a conveyor device having at least one carrying element configured to advance the packs from an inlet region of the feeding unit to an outlet region of the feeding unit; and a feed screw device at the outlet region and configured to receive the packs from the conveyor device, to advance the packs along a braking path and to feed the packs to the folding unit; the feed screw device is configured to decrease the velocity of the packs along the braking path.

14 Claims, 6 Drawing Sheets

(58) Field of Classification Search
CPC ......... B65B 35/26; B65B 35/56; B65B 35/58; B65G 47/24; B65G 47/248; B65G 47/244; B65G 33/04; B65G 33/06; B65G 2201/0244; B65G 47/841
USPC .......................................... 198/467.1, 459.4
See application file for complete search history.

(56) References Cited

U.S. PATENT DOCUMENTS

| | | | | |
|---|---|---|---|---|
| 3,841,946 | A * | 10/1974 | Carter | B65C 9/06 156/566 |
| 4,198,901 | A * | 4/1980 | Knudsen | B31B 50/00 493/103 |
| 4,548,668 | A * | 10/1985 | Roth | B31B 50/0045 53/367 |
| 5,117,965 | A * | 6/1992 | Newell | B65G 33/06 198/444 |
| 5,477,956 | A * | 12/1995 | Liebhart | B65G 33/04 198/346.2 |
| 5,765,675 | A * | 6/1998 | Draghetti | B65G 33/04 198/408 |
| 5,983,961 | A * | 11/1999 | Boellmann | B65B 1/12 141/156 |
| 6,006,891 | A * | 12/1999 | Iwano | B65G 47/248 198/417 |
| 6,213,281 | B1 * | 4/2001 | Biondi | B65G 47/843 198/408 |
| 6,386,353 | B1 * | 5/2002 | Gerber | B65G 47/28 198/660 |
| 7,225,601 | B2 * | 6/2007 | Spatafora | B65G 47/08 53/542 |
| 9,309,055 | B2 | 4/2016 | Pedretti et al. | |
| 10,029,814 | B2 | 7/2018 | Galata' | |
| 10,087,008 | B2 | 10/2018 | Mattioli et al. | |
| 10,093,484 | B2 | 10/2018 | Mattioli et al. | |
| 10,375,986 | B1 * | 8/2019 | Williams | A24C 5/1821 |
| 2001/0030106 | A1 * | 10/2001 | Yamamoto | B65B 61/24 198/626.1 |
| 2011/0067976 | A1 * | 3/2011 | Pelagatti | B65G 47/82 198/431 |
| 2013/0284561 | A1 * | 10/2013 | Santi | B65G 47/248 198/417 |
| 2017/0166401 | A1 * | 6/2017 | Mattioli | B65G 15/16 |

FOREIGN PATENT DOCUMENTS

| | | |
|---|---|---|
| CN | 106458343 A | 2/2017 |
| CN | 106470903 A | 3/2017 |
| EP | 0061663 A2 | 10/1982 |
| EP | 1145960 A2 | 10/2001 |
| EP | 3009359 A1 | 4/2016 |

OTHER PUBLICATIONS

Extended European Search Report issued Mar. 2, 2021, for corresponding European Patent Application No. 20199223.7.

* cited by examiner

FEEDING UNIT FOR FEEDING SEALED SEMI-FINISHED PACKS CONTAINING A POURABLE PRODUCT TO A FOLDING UNIT

TECHNICAL FIELD

The present invention relates to a feeding unit configured to receive sealed pillow-shaped packs containing a pourable product, preferably a pourable food product, from a forming unit arranged to form the packs and to feed the pillow packs to a folding unit arranged to fold the pillow packs so as to obtain fully-folded finished packages.

BACKGROUND ART

As it is generally known, many pourable food products, such as fruit juice, UHT (ultra-high temperature-treated) milk, wine, tomato sauce, etc., are sold in packages made of sterilized packaging material.

A typical example is the parallelepiped-shaped package for pourable food products known as a TETRA BRIK® aseptic container, which is made by folding and sealing a laminated web of packaging material. The packaging material has a multilayer structure comprising a base layer, e.g. made of paper, covered on both sides with layers of heat-seal plastic material, e.g. polyethylene.

In the case of aseptic packages for long-storage products, such as UHT milk, the packaging material also comprises a layer of oxygen-barrier material, e.g. an aluminum foil, which is superimposed on a layer of heat-seal plastic material, and is in turn covered with another layer of heat-seal plastic material forming the inner face of the package eventually contacting the food product.

Packages of this sort are normally produced in fully automatic packaging assemblies, in which a continuous tube is formed from a web of packaging material. The web of packaging material is sterilized in the packaging assembly, e.g. by applying a chemical sterilizing agent, such as hydrogen peroxide solution, which, once sterilization is completed, is removed from the surfaces of the packaging material, e.g. evaporated by heating. The web so sterilized is then maintained in a closed, sterile environment, and is folded and sealed longitudinally to form the tube, which is fed along a vertical advancing direction.

Subsequently, the tube is filled with the sterilized food product from above and is sealed and then cut along equally spaced transversal cross sections.

Pillow packs are obtained thereby, which have a longitudinal sealing band, a top transversal sealing band and a bottom transversal sealing band.

The known packaging assemblies typically comprise a forming unit configured to form the pillow packs, wherein the tube is filled continuously with the sterilized or sterile-processed food product and is formed, sealed and then cut along the above-mentioned cross-sections to obtain the pillow packs.

The pillow packs thereby obtained are then fed to a folding unit to form fully-folded finished packages.

Folding units are known, substantially comprising a chain conveyor, configured for advancing the pillow packs continuously along a folding path, and a plurality of folding devices each one of which cooperates cyclically with a respective pillow pack along the folding path, so as to fold such pillow pack into a finished, fully-folded package.

Packaging assemblies normally also comprise a feeding unit configured to receive the pillow packs from the forming unit and to feed the pillow packs to the folding unit.

Within the forming unit, the pillow packs are usually formed and sealed with their respective axes arranged vertically. The newly formed pillow packs are subsequently cut from the tube and let slide (by gravity) along a curved-profile chute arranged below the forming unit, so as to be brought from the vertical position to a substantially horizontal position, in which they are received by the feeding unit.

In practice, the feeding unit is arranged immediately downstream of the chute and immediately upstream of the folding unit.

Typically, the feeding unit comprises two support guides extending between an inlet region, at which the pillow packs coming from the chute are received, and an outlet region, at which the pillow packs are delivered to the folding unit.

The feeding unit further comprises a conveyor belt and a plurality of carriers fitted to the conveyor belt at equidistant positions along the conveyor belt. The carriers project from the conveyor belt and are configured to cooperate in contact with the pillow packs to advance the pillow packs along the guides.

In practice, each carrier is configured to push a respective pillow pack from behind, so as to drive it along the guides, from the inlet region to the outlet region, at which each pillow pack is delivered by the conveyor belt to the folding unit.

The conveyor belt is normally wound around a first wheel and a second wheel, the first wheel and the second wheel conveniently having substantially horizontal axes. In this way, the conveyor belt has a lower active branch and an upper return branch, the carriers of the lower active branch, thereby pushing the pillow packs and conveying the pillow packs from the forming unit towards the folding unit.

Although being functionally valid, the known feeding units are still open to further improvement. In particular, a need is felt to reduce the risk of deformation of the pillow packs during handling thereof.

DISCLOSURE OF INVENTION

It is therefore an object of the present invention to provide a feeding unit, which is designed to meet at least the above-mentioned need in a straightforward and low-cost manner.

BRIEF DESCRIPTION OF THE DRAWINGS

Non-limiting embodiments of the present invention will be described by way of example with reference to the accompanying drawings, in which.

BEST MODE FOR CARRYING OUT THE INVENTION

Figure 1:
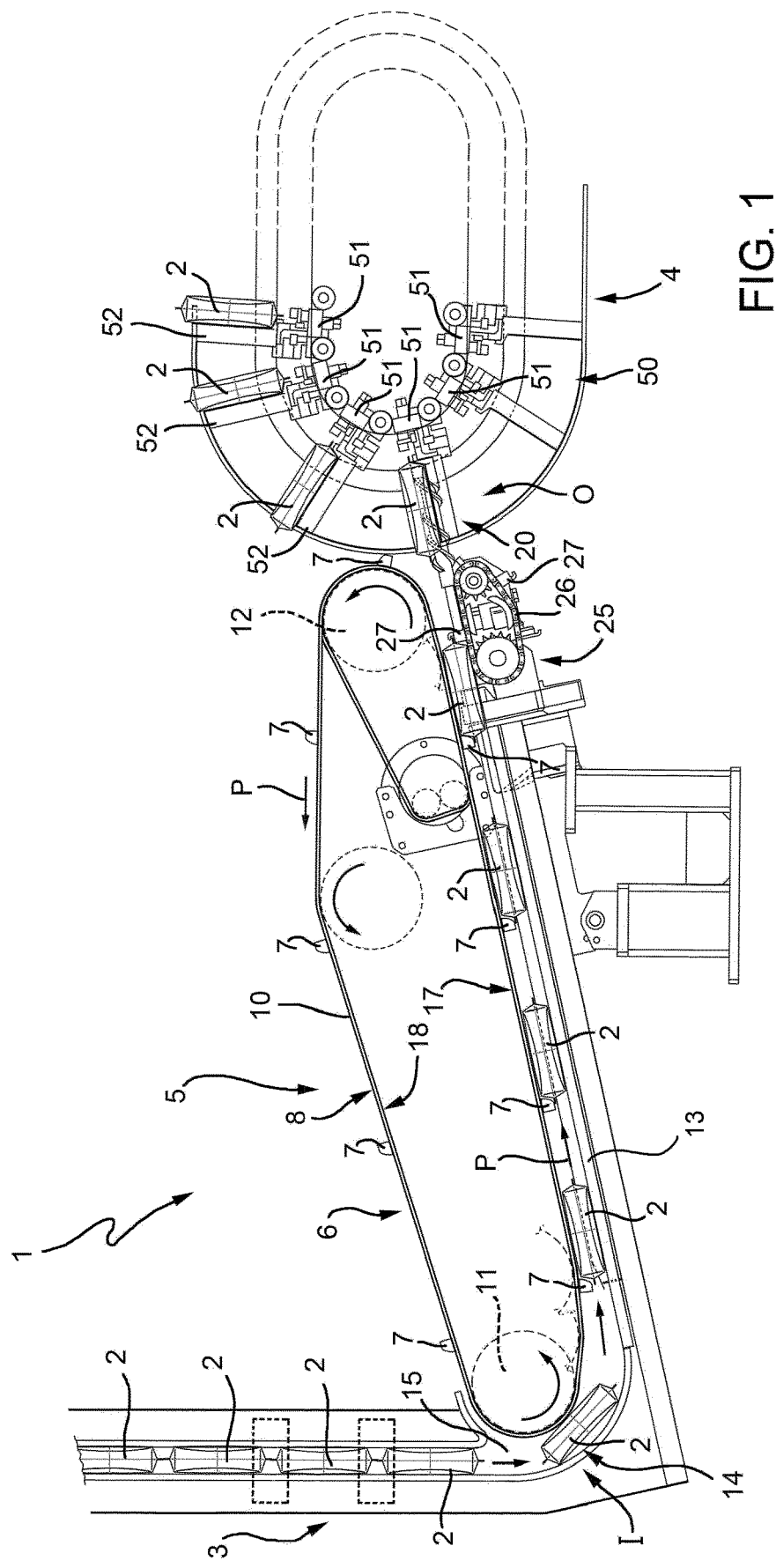
FIG. 1 is a schematic side view, with parts removed for clarity, of a packaging assembly for forming, sealing and folding semi-finished packs containing a pourable product and comprising a feeding unit according to a first embodiment of the present invention.

With reference to FIG. 1, number 1 indicates as a whole a packaging assembly configured to form, seal and fold a plurality of semi-finished packs 2 containing a pourable product, preferably a pourable food product, starting from a tube (not shown) of packaging material.

The packaging material has a multilayer structure (not shown), and comprises a layer of fibrous material, e.g. paper, covered on both sides with respective layers of heat-seal plastic material, e.g. polyethylene.

In the case of aseptic packs 2 for long-storage products, such as UHT milk, the packaging material also comprises a layer of gas-and-light barrier material, e.g. aluminum foil or ethylene vinyl alcohol (EVOH) film, which is superimposed on a layer of heat-seal plastic material, and is in turn covered with another layer of heat-seal plastic material, the latter forming the inner face of the pack 2 eventually contacting the pourable product.

The tube is formed in a known manner by longitudinally folding and sealing a web (not shown) of packaging material.

As visible in FIG. 1, packaging assembly 1 comprises a forming unit 3, a folding unit 4 and a feeding unit 5 operatively interposed between the forming unit 3 and the folding unit 4.

The forming unit 3 receives, in use, the tube of packaging material and is configured to fill, form and seal the tube of packaging material in order to obtain a plurality of pillow-shaped packs 2 containing the pourable product, according to a manner known and not described in detail.

In particular, the tube is filled from above by a pipe (not shown) with the pourable product and is fed through forming unit 3 along a straight, preferably vertical, advancing direction.

The tube is then formed, sealed and cut along equally spaced cross sections to form packs 2.

Figure 6:
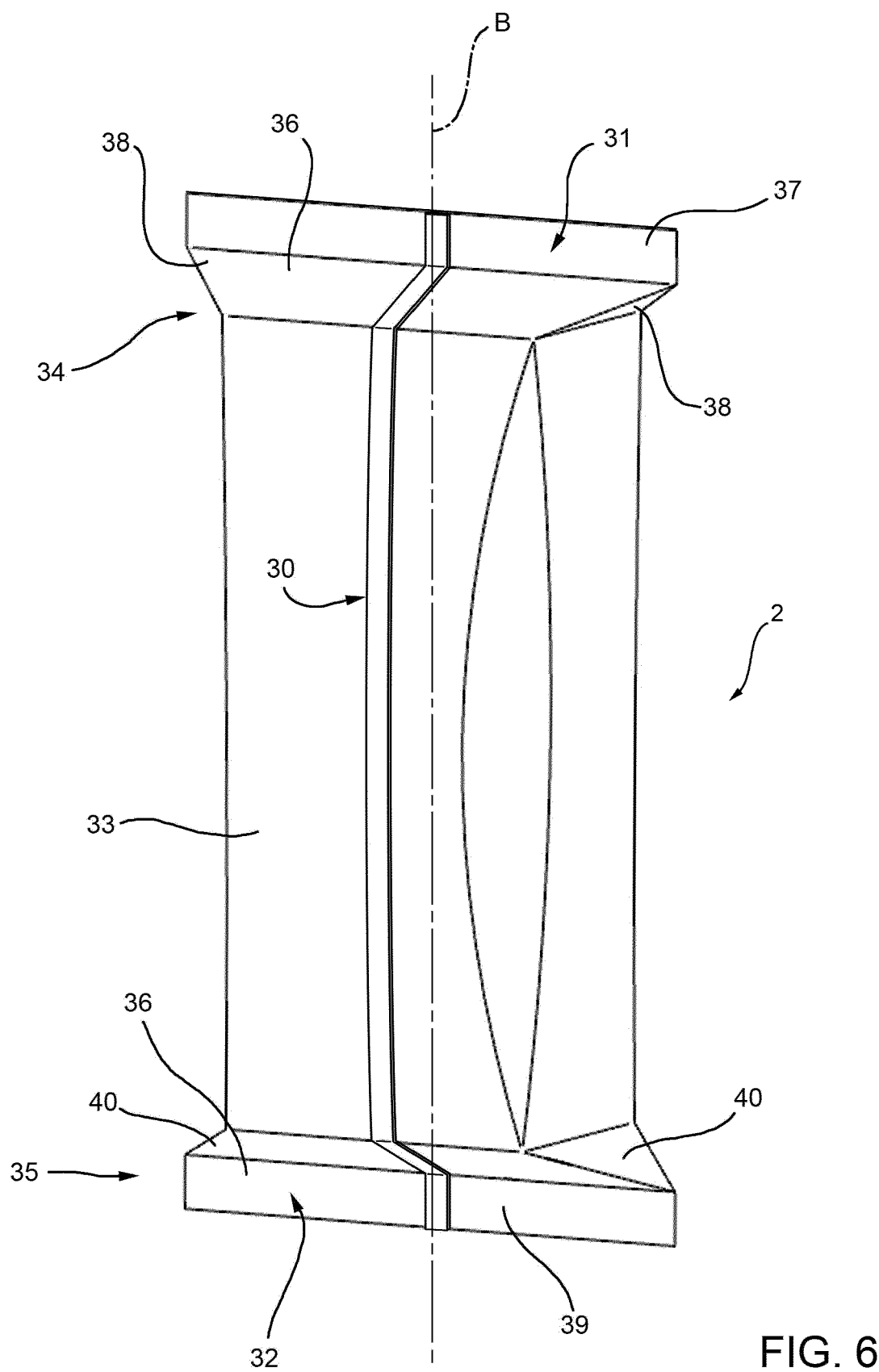
FIG. 6 is a perspective view, with parts removed for clarity, of a semi-finished pack to be handled by the feeding unit according to the present invention.

With reference to FIG. 6, an embodiment of a pack 2 is shown, which has a longitudinal sealing band 30 formed to produce the tube of packaging material from the web folded into a cylinder and extending along one side of pack 2. Pack 2 is closed at opposite distal ends by a first transversal sealing band 31 and a second transversal sealing band 32, both perpendicular and joined to the longitudinal sealing band 30.

Each pack 2 has an axis B and comprises a main portion 33, which extends along axis B and defines a main body, a first end portion 34, defining a top end portion, and a second end portion 35, defining a bottom end portion; first end portion 34 and second end portion 35 project and taper from opposite axial sides of main portion 33 towards the first sealing band 31 and the second sealing band 32, respectively.

Main portion 33 is bound by a number of lateral walls.

First end portion 34 and second end portion 35 are each defined by two walls 36, each in the form of an isosceles trapezium, sloping towards each other and having major edges joined at first sealing band 31 and second sealing band 32, respectively.

First end portion 34 comprises a substantially elongated end fin 37, formed by first transversal sealing band 31 and projecting along axis B, and two substantially triangular flaps (top flaps 38), projecting laterally on opposite sides of main portion 33.

Similarly, second end portion 35 comprises a substantially elongated end fin 39, formed by second transversal sealing band 32 and projecting along axis B, and two substantially triangular flaps (bottom flaps 40), projecting laterally on opposite sides of main portion 33.

According to this embodiment, the substantially triangular flaps of first end portion 34 define the top flaps 38 of each pack 2, whereas the substantially triangular flaps of second end portion 35 define the bottom flaps 40 of each pack 2.

Folding unit 4 is configured to receive formed and sealed packs 2 by means of feeding unit 5 and to fold them so as to obtain fully folded packages (not shown).

According to one preferred embodiment, folding unit 4 comprises a chain conveyor 50 for advancing packs 2 received from feeding unit 5.

In detail, chain conveyor 50 comprises a plurality of link elements 51 movably coupled to chain conveyor 50 so as to move, in use, along a folding path.

Each link element 51 defines a respective seat configured to receive one respective pack 2 to be folded at a time and carries a respective paddle 52 for supporting such pack 2 while such pack 2 is carried by the link element 51.

Folding unit 4 further comprises a plurality of folding devices (known per se and not shown nor described in detail) configured to fold packs 2 while packs 2 are advanced by chain conveyor 50.

According to a manner known and not described in detail, in order to form a package from a pack 2, folding unit 4 presses first end portion 34 and second end portion 35 down flat towards each other, and at the same time folds the first end fin 37 onto the flattened first end portion 34 and the second end fin 39 onto the flattened second end portion 35.

Then, folding unit 4 folds top flaps 38 onto the lateral walls of main portion 33, and bottom flaps 40 onto the previously folded second end fin 39.

Feeding unit 5 is configured to receive packs 2 from forming unit 3 and to feed packs 2 to folding unit 4. Accordingly, feeding unit 5 is arranged downstream of forming unit 3 and upstream of folding unit 4.

In detail, feeding unit 5 comprises a conveyor device 6 having a flexible conveying element 8 and at least one carrying element 7 movably carried by the flexible conveying element 8, projecting from the flexible conveying element 8 and configured to sequentially cooperate in contact with one respective pack 2 at a time.

According to the embodiment shown, the flexible conveying element 8 comprises an endless toothed belt 10 wound about a first rotatable body, in particular a first toothed wheel 11 meshing with the toothed belt 10, and about a second rotatable body, in particular a second toothed wheel 12 meshing with the toothed belt 10, thereby defining a closed-loop belt.

The first toothed wheel 11 and the second toothed wheel 12 drive the toothed belt 10 causing the same to move, in use, along an endless advancing path P.

The feeding unit 5 comprises an inlet region I, at which packs 2 enter conveyor device 6 and an outlet region O, at which packs 2 leave conveyor device 6.

Preferably, feeding unit 5 further comprises a chute 14 arranged at inlet region I and receiving, in use, packs 2 from forming unit 3 and directing packs 2 towards advancing path P. In particular, chute 14 is arranged on a side of first toothed wheel 11 and defines together with this latter a curve-shaped channel 15, or passage, for packs 2.

In the embodiment shown, conveyor device 6 comprises a plurality of the above-mentioned carrying elements 7, which are fitted at equally spaced positions on toothed belt 10 and are cyclically movable along advancing path P, carried in their movement by the toothed belt 10.

Each carrying element 7 is configured to sequentially advance a respective pack 2 from inlet region I, at which packs 2 reach advancing path P, to outlet region O, at which packs 2 leave advancing path P.

More precisely, each carrying element 7 is configured to interact with the second end portion 35 of one respective pack 2 at a time, by pushing against second end portion 35 and thereby moving pack 2 from inlet region I to outlet region O.

Figure 2:
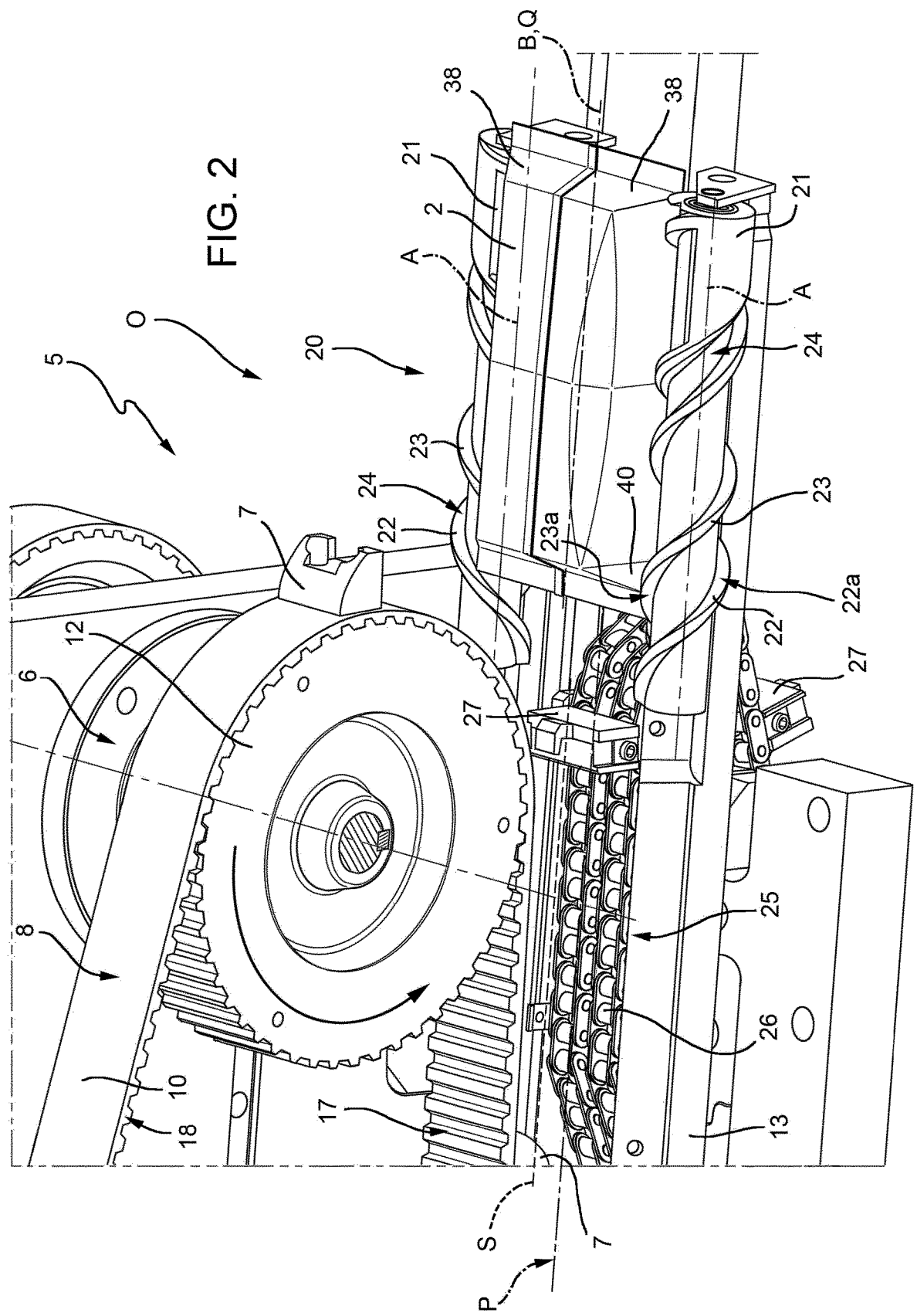
FIG. 2 is a larger-scale, perspective view, with parts removed for clarity, of a detail of the feeding unit of FIG. 1.
Figure 3:
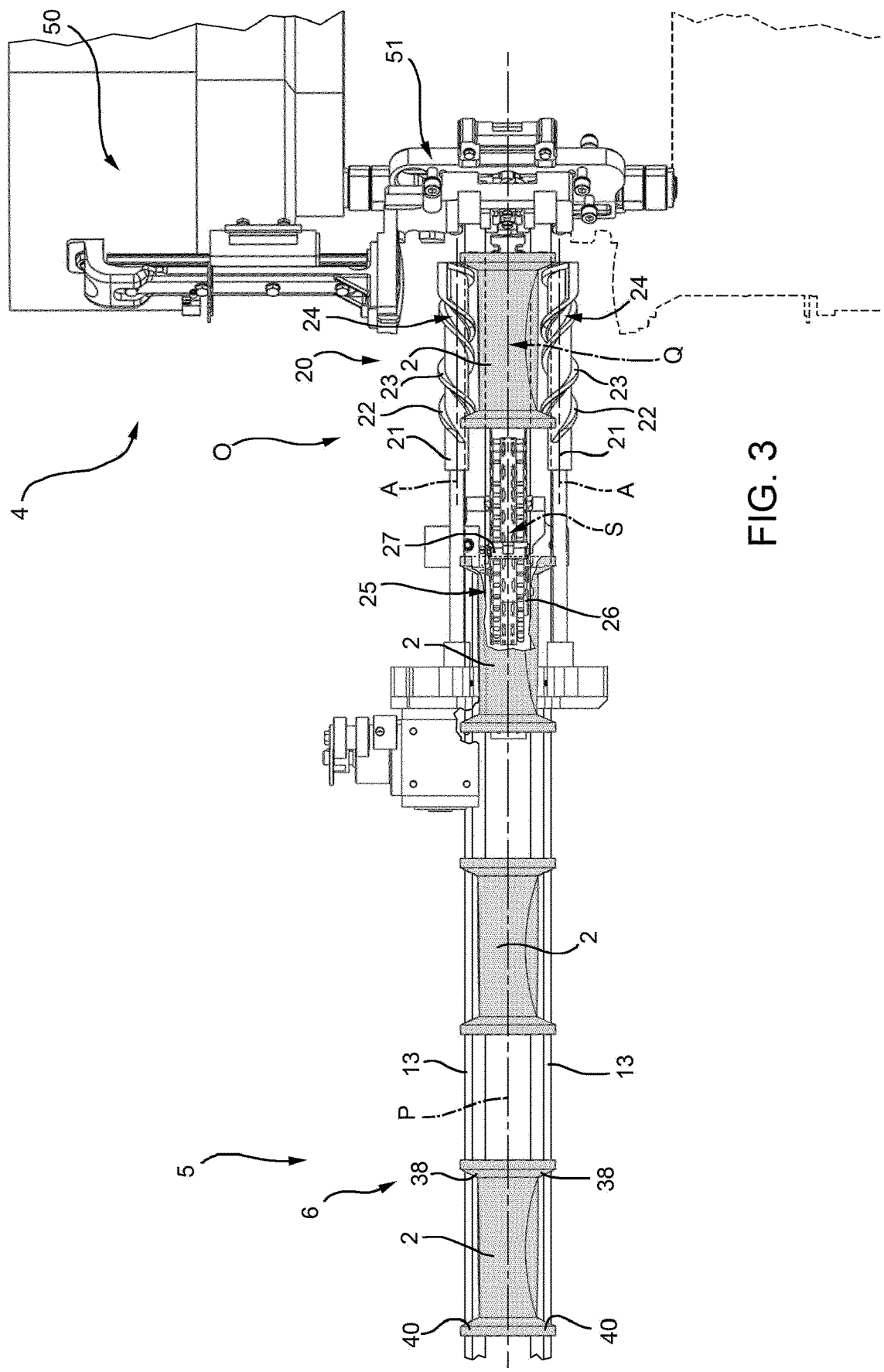
FIG. 3 is a larger-scale, top view, with parts removed for clarity, of a detail of the feeding unit of FIG. 1.

As visible in FIGS. 1, 2 and 3, conveyor device 6 further comprises a guide arrangement 13 configured to receive packs 4 at inlet region I and on which packs 2 are configured to slide while advancing along advancing path P.

In practice, guide arrangement 13 receives, in use, packs 2 from chute 14 and supports such packs 2 during their movement towards outlet region O.

Conveniently, guide arrangement 13 comprises two guide rails configured to support packs 2 from below.

In light of the above, toothed belt 10 comprises:
- a lower active branch 17 facing towards the guide arrangement 13 and along which carrying elements 7 interact with respective packs 2, transporting such packs 2 from inlet region I to outlet region O; and
- an upper return branch 18 along which carrying elements 7, carried by toothed belt 10, move in use from outlet region O back to inlet region I, the upper return branch 18 and the guide arrangement 13 being positioned on opposite sides of the lower active branch 18.

For the sake of brevity, reference is now made to a single pack 2 to be transferred from forming unit 3 to folding unit 4 by means of feeding unit 5. However, the structural and functional features described hereinafter apply to each pack 2 to be transferred by feeding unit 5.

As visible in FIGS. 1, 2 and 3, feeding unit 5 further comprises a feed screw device 20 arranged at outlet region O and configured to sequentially receive pack 2, in particular one pack 2 at a time, from conveyor device 6, to sequentially advance the pack 2 received along a braking path Q and to sequentially feed such pack 2 to folding unit 4.

Conveniently, feed screw device 20 is configured to decrease the velocity of pack 2 along braking path Q.

To this end, feed screw device 20 comprises at least one feed screw element 21 rotatable about its own longitudinal axis A and having:
- a first outer thread 22 extending on an external surface of feed screw element 21 and helically wound around axis A; and
- a second outer thread 23 extending on the external surface of feed screw element 21 and helically wound around axis A offset from first thread 22 by a predetermined non-zero distance.

Therefore, first thread 22 and second thread 23 define, or delimit, between them a helical slot 24 the longitudinal width of which, relative to axis A, defines the above-mentioned non-zero distance, and configured to sequentially receive and retain (i.e. to house) at least a portion, in particular a folding portion of pack 2 along braking path Q.

More specifically, in use, helical slot 24 receives the folding portion at a receiving station of feed screw element 21, supports the folding portion along braking path Q and releases the folding portion at a release station of feed screw element 21, at which pack 2 is transferred to folding unit 4, in particular to the relative link element 51.

Preferably, feed screw element 21 is defined by a substantially cylindrical element of axis A and on the external surface of which first thread 22 and second thread 23 are wound.

It is stated that the wording "along braking path Q" is intended to indicate herein the braking path Q itself and also any direction parallel to braking path Q. Therefore, for example, the sentence "helical slot 24 is configured to retain and support the folding portion along braking path Q" accordingly indicates that helical slot 24 is configured to retain and support the folding portion along a direction parallel to braking path Q, i.e. along the same linear direction from the receiving station to the release station, as shown in FIGS. 2 and 3.

Accordingly, axis A is arranged laterally and parallel to braking path Q.

In this way, it is clear how helical slot 24 retains and supports, in use, the folding portion along a direction parallel to braking path Q.

In light of the above, due to the rotational movement of feed screw element 21, helical slot 24 is also configured to advance pack 2 along braking path Q, by advancing its folding portion.

In particular, feed screw element 21 is configured to rotate with a constant rotational velocity about axis A.

According to this preferred non-limiting embodiment shown, the folding portion is defined by each one of the top flaps 38 of pack 2. Hence, helical slot 24 is configured to sequentially receive one top flap 38 at a time and to support and retain the same top flap 38 along braking path Q, thereby advancing the relative pack 2 along braking path Q due to rotation of feed screw element 21 about axis A.

First thread 22 and second thread 23 have respective pitches which are variable along the direction of advancement of pack 2 along braking path Q.

Conveniently, such pitches decrease along the direction of advancement of packs 2 along braking path Q. Therefore, the pitches decrease from the receiving station of the feed screw element 21 to the release station of the feed screw element 21.

The longitudinal width of helical slot 24 also decreases along the direction of advancement of packs 2 along braking path Q, i.e. from the receiving station to the release station.

Since feed screw element 21 is configured to rotate at a constant rotational velocity, the decreasing of the pitch of first thread 22 and of the pitch of second thread 23 causes a deceleration of top flap 38 supported by helical slot 24; this is due to the fact that for each revolution of feed screw element 21 about axis A, the linear distance traveled by top flap 38 along axis A decrease from the receiving station towards the release station.

Therefore, the above configuration causes the pack 2 to decelerate and slow down in correspondence of outlet region O.

Preferably, carrying element 7 is configured to push pack 2 until pack 2 reaches braking path Q, at the receiving station of feed screw element 21, and also for a certain distance downstream of the receiving station and upstream of the release station.

Due to the above configuration, pack 2 is still pushed by carrying element 7 at the moment top flap 38 is first received by helical slot 24. This ensures that pack 2 is moved forward, by carrying element 7, until helical slot 24 has become narrow enough, due to the decreasing pitches, to drive pack 2 along braking path Q by itself.

At this point, carrying element 7 loses contact with second end portion 35 of pack 2 and initiates its return movement along upper return branch 18.

This configuration ensures that even at the moment pack 2 is received by feed screw element 21 sudden decelerations of pack 2 are avoided and the same advancing velocity is initially maintained. The decreasing pitch of first thread 22 and second thread 23, and the longitudinal shrinking of helical slot 24, provides for a gradual deceleration of pack 2.

At the point helical slot 24 is narrow enough to drive top flap 38, and therefore pack 2, by itself, first thread 22 and second thread 23 cooperate in contact with top flap 38, driving top flap 38 and advancing top flap 38, and therefore pack 2, along braking path Q with decreasing velocity, until pack 2 reaches the release station of feed screw element 21.

More specifically, first thread 22 and second thread 23 comprise respective lateral surfaces 22a, 23a facing one another, relatively to axis A, and configured to cooperate in contact with top flap 38, so as to drive top flap 38 along braking path Q.

In light of the above, along a first portion of braking path Q, first thread 22, second thread 23 and, therefore, helical slot 24, support top flap 38; along a second portion of braking path Q, first thread 22, second thread 23 and, therefore, helical slot 24, drive and advance top flap 38.

In one embodiment, second thread 23 further comprises a cam portion (not shown) extending onto an end portion of lateral surface 23a, preferably arranged at the release station of feed screw element 21, adapted to receive top flap 38 and configured to cooperate in contact with the respective bottom flap 40 at the release station, so as to tilt pack 2 relative to braking path Q at the release station.

In practice, the cam portion is defined by a portion of lateral surface 23a which is inclined with respect to the rest of lateral surface 23a. Preferably, the cam portion is inclined so as to define an ascending ramp relatively to the rest of lateral surface 23a.

This results in second end portion 35 of pack 2 to be lifted with respect to braking path Q, and in pack 2 to be tilted of a given angle.

Such configuration ensures that pack 2 reaches the respective link element 51, and therefore the respective folding device, of folding unit 4 with the appropriate angle.

In another embodiment, first thread 22 comprises the above-mentioned cam portion, extending onto an end portion of lateral surface 22a and configured to cooperate in contact with the respective bottom flap 40 at the release station, so as to tilt pack 2 relative to braking path Q at the release station.

According to this preferred non-limiting embodiment, feed screw device 20 comprises a further feed screw element 21 substantially identical to the feed screw element 21 described above and arranged laterally and parallel to such feed screw element 21.

Therefore, further feed screw element 21 is configured, by means of its first thread 22, second thread 23 and helical slot 24, to receive, support and/or retain the other top flap 38 of the pack 2 being advanced along braking path Q.

In light of the above, feed screw device 20 comprises two feed screw elements 21, substantially identical to one another, each interacting with one respective top flap 38 of pack 2 and defining between them braking path Q.

Preferably, feeding unit 5 further comprises a braking unit 25 arranged upstream of feed screw device 20, and therefore upstream of braking path Q, relative to the direction of advancement of pack 2 from inlet region I to outlet region O, and configured to slow down pack 2 along a slowing path S (FIGS. 2 and 3), so that pack 2 is kept in contact with carrying element 7 at outlet region O.

In the embodiment shown, braking unit 25 is substantially correspondent to the one illustrated in EP-B-3009359 from the same Applicant and further ensures that packs 2 reach feed screw device 20 with the appropriate timing and phasing so that top flaps 38 can be handled nominally by first thread 22 and second thread 23.

In detail, braking unit 25 comprises a flexible conveying arrangement, in particular an endless chain 26, and a plurality of braking elements 27 movably carried by chain 26, positioned at a constant distance along chain 20 and projecting from chain 26.

In greater detail, each braking element 27 is configured to interact with first end portion 34 of one respective pack 2 at a time so as to provide a moving abutment for the same pack 2, thereby slowing down pack 2 before reaching feed screw device 20 and ensuring a nominal and synchronized entrance of pack 2 into braking path Q.

The braking unit 25 and the conveyor device 6 are arranged on opposite sides of guide arrangement 13.

Chain 26 is shaped as a loop and is partially wound and supported by two wheels. In particular, in use, chain 26 rotates in opposite direction with respect to toothed belt 10, whilst pack 2 is being advanced along advancing path P.

During operation, when pack 2 reaches outlet region O, it may be in contact with carrying element 7 or separated, i.e. at a certain non-zero distance along lower active branch 17 of advancing path P.

In the latter case, second end portion 35 substantially does not interact continuously with carrying element 7 and there is a substantial risk that pack 2 is fed to feed screw device 20 in a non-synchronized way.

This is avoided, as shown in FIGS. 1 and 3, since, once having reached braking unit 25, pack 2 interacts both with carrying element 7 and braking element 27. In practice, carrying element 7 and braking element 27 define a compartment within which pack 2 is supported.

This prevents pack 2 from interacting with feed screw device 20 (and from entering braking path Q) too early.

The operation of feeding unit 5 is described hereinafter with reference to a single pack 2 being transferred from forming unit 3 to folding unit 4 and starting from a condition in which pack 2 reaches advancing path P from chute 14.

In this condition, pack 2 is supported by guide arrangement 13 and one corresponding carrying element 7 starts to push second end portion 35 of pack 2.

Once pack 2 reaches braking unit 25, first end portion 34 abuts against one corresponding braking element 27.

Then, pack 2 reaches the receiving station of feed screw elements 21 and its top flaps 38 are received in helical slots 24 and start to be supported by the respective first threads 22 and second threads 23.

When carrying element 7 finishes to interact with pack 2, feed screw elements 21 drive pack 2 towards the release station, at which pack 2 leaves feeding unit 5 and enters folding unit 4.

The operation is repeated cyclically for each pack 2 to be fed from forming unit 3 to folding unit 4.

Figure 4:
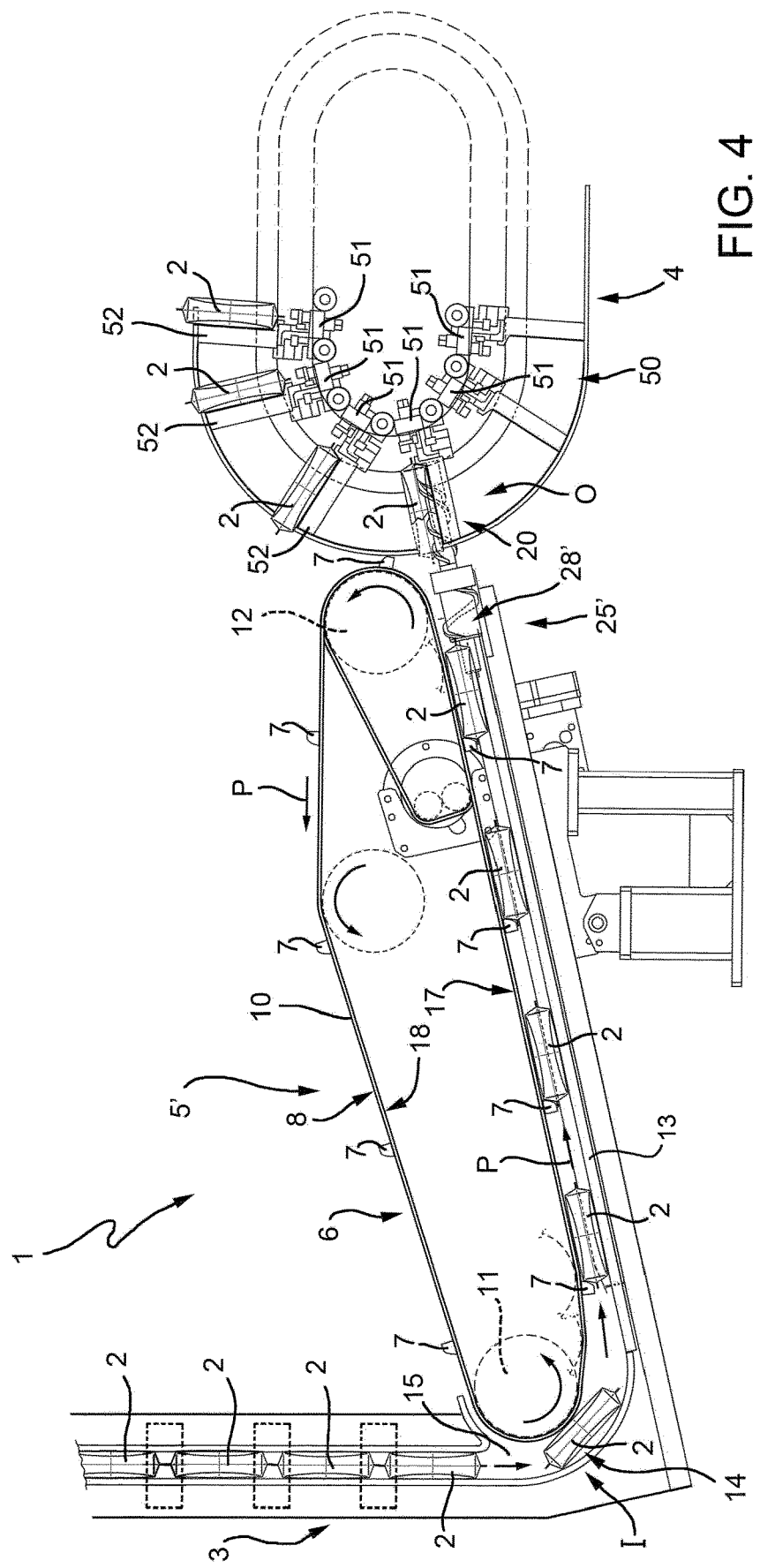
FIG. 4 is a schematic side view, with parts removed for clarity, of a packaging assembly for forming, sealing and folding semi-finished packs containing a pourable product and comprising a feeding unit according to a second embodiment of the present invention.
Figure 5:
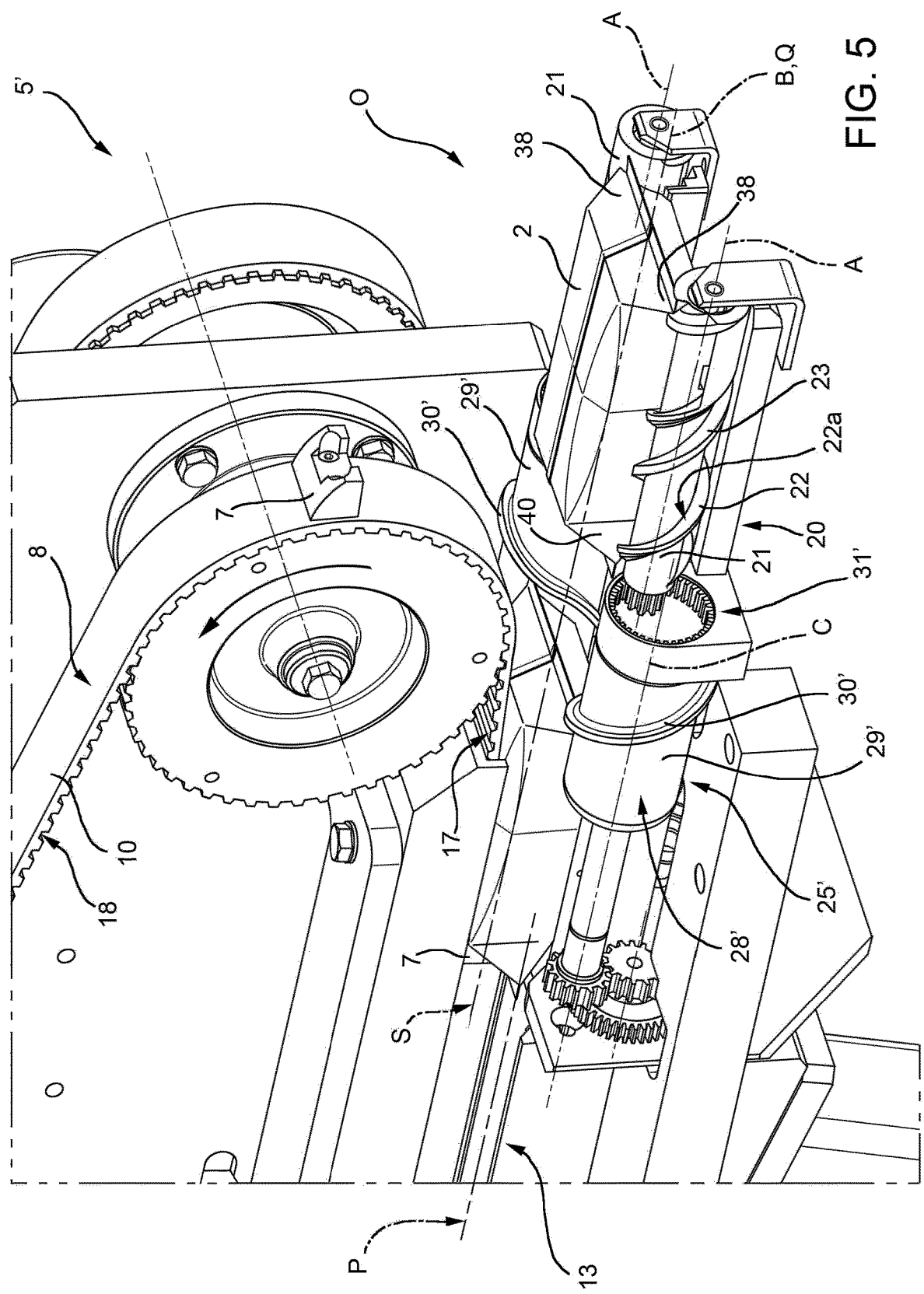
FIG. 5 is a larger-scale, perspective view, with parts removed for clarity, of a detail of the feeding unit of FIG. 4.

Number 5' in FIGS. 4 and 5 indicates as a whole a feeding unit of packaging assembly 1 according to a second embodiment of the present invention.

Feeding unit 5' being similar to feeding unit 5 according to the first embodiment, the following description is limited to the differences between them, and using the same references, where possible, for identical or corresponding parts.

In particular, feeding unit 5' differs from feeding unit 5 in that it comprises a braking unit 25' having an additional feed screw device 28'.

As visible in FIG. 5, additional feed screw device 28' comprises at least one additional feed screw element 29' rotatable about its own longitudinal axis C and having an additional outer thread 30' wound around axis C and configured to receive and support the folding portion, i.e. the relative top flap 38, of pack 2 along slowing path S.

Axis C is arranged parallel to slowing path S.

Additional feed screw element 29' is configured to rotate at a constant rotational velocity.

In practice, carrier element 7 pushes, in use, pack 2 along advancing path P until pack 2 reaches slowing path S. At this point, top flap 38 abuts against additional thread 30' and pack 2 is slowed down along slowing path S.

Conveniently, additional feed screw element 29' is so configured that its rotation is synchronized with the rotation of feed screw elements 21, so as to ensure the nominal and synchronized entrance of pack 2 along braking path Q.

In one embodiment, additional feed screw device 28' comprises two substantially identical additional feed screw elements 29', arranged laterally and parallel to one another and defining between them slowing path S.

Preferably, additional feed screw device 28' is driven by feed screw device 20. In particular, each additional feed screw element 29' is driven by one respective feed screw element 21.

To this end, each additional feed screw element 29' is cinematically coupled to the corresponding feed screw element 21 by means of a respective gearing 31'.

In this way, there is no need for further driving actuators to drive additional feed screw device 28'. Furthermore, the synchronization between additional feed screw device 28' and feed screw device 20 can be easily obtained and maintained.

The advantages of feeding unit 5, 5' according to the present invention will be clear from the foregoing description.

In particular, thanks to the configuration of feed screw device 20 as described above, packs 2 can be slowed down efficiently before being transferred to the folding unit 4, thereby at least limiting or avoiding deformations of packs 2 due to sudden impact and/or sudden change in velocity, especially when packs 2 reach the respective seats defined by link elements 51.

Moreover, since the deceleration of packs 2 takes place due to the variable pitches of first thread 22 and second thread 23, feed screw elements 21 can rotate at a constant speed, thereby avoiding the need for a complex and cumbersome actuator system for driving feed screw elements 21.

Furthermore, in the case of feeding unit 5', thanks to the configuration of braking unit 25', nominal synchronization between conveyor device 6 and feed screw device 20 can be obtained easily and without complicating the architecture of the machine.

Clearly, changes may be made to feeding unit 5, 5' as described herein without, however, departing from the scope of protection as defined in the accompanying claims.

In particular, each feed screw element 21 could comprise only first thread 22. In this case, first thread 22 would be configured to receive and support the relative top flap 38 along braking path Q, until pack 2 reaches the release station. Accordingly, first thread 22 would support top flap 38 along braking path Q from behind. In use, once carrying element 7 stops pushing second end portion 35, first thread 22 drives top flap 38 and therefore pack 2 by itself, thereby advancing top flap 38 along braking path Q and slowing pack 2 thanks to its variable pitch.

Alternatively, each feed screw element 21 could comprise only second thread 23. In this latter case, second thread 23 would be configured to receive and support the relative top flap 38 along braking path Q, until pack 2 reaches the release station. Accordingly, second thread 23 would support top flap 38 from ahead. In use, once carrying element 7 stops pushing second end portion 35, the momentum imparted by carrying element 7 to pack 2 pushes pack 2 towards the release station, thereby advancing pack 2 along braking path Q, while second thread 23 supports top flap 38, slowing pack 2 thanks to its variable pitch.

The invention claimed is:

1. A feeding unit configured to feed semi-finished sealed packs containing a pourable product to a folding unit adapted to fold said packs so as to obtain folded packages, said feeding unit comprising:
   a conveyor device having at least one carrying element configured to advance said packs from an inlet region of said feeding unit to an outlet region of said feeding unit; and
   a feed screw device arranged at said outlet region and configured to receive and support said packs from said conveyor device, to advance said packs along a braking path and to feed said packs to said folding unit;
   said feed screw device being configured to decrease the velocity of said packs along said braking path,
   wherein said feed screw device comprises at least one feed screw element rotatable about its own longitudinal axis and having a first outer thread wound around said longitudinal axis and configured to receive and support at least a supported portion of said packs along said braking path; said first outer thread having a first pitch variable along a direction of advancement of said packs along said braking path, and
   wherein said at least one feed screw element has a further outer thread wound around said longitudinal axis, offset from said first outer thread, and having a further pitch variable along the direction of advancement of said packs along said braking path; said first outer thread and said further outer thread defining between them a helical slot disposed along said longitudinal axis configured to receive and retain said portion along said braking path.

2. The feeding unit as claimed in claim 1, wherein said first pitch decreases along the direction of advancement of said packs along said braking path.

3. The feeding unit as claimed in claim 2, wherein said first outer thread receives, in use, said portion at a receiving station of said at least one feed screw element, supports, in use, said portion along said braking path and releases, in use, said portion at a release station of said at least one feed screw element; and wherein said first pitch decreases from said receiving station to said release station.

4. The feeding unit as claimed in claim 1, wherein the further pitch of said further outer thread decreases along the direction of advancement of said packs along said braking path.

5. The feeding unit as claimed in claim 1, wherein the longitudinal width of said helical slot decreases along the direction of advancement of said packs along said braking path.

6. The feeding unit as claimed in claim 1, wherein each said pack comprises a main portion, a top end portion and a bottom end portion; said top end portion and said bottom end portion projecting from opposite distal sides of said main portion and comprising respective top flaps and bottom flaps adapted to be folded on said main portion;

and wherein said top flaps define said supported portions of said packs along said braking path.

7. The feeding unit as claimed in claim 6, wherein said first outer thread comprises a cam portion extending onto part of a lateral surface of said first outer thread adapted to receive said top flaps, and configured to cooperate in contact with said bottom flaps at a release station of said at least one feed screw element, so as to tilt each said pack relative to said braking path at said release station.

8. The feeding unit as claimed in claim 1, wherein said at least one feed screw element is configured to rotate at a constant rotational velocity about its own longitudinal axis.

9. The feeding unit as claimed in claim 1, wherein said feed screw device comprises a further feed screw element rotatable about its own longitudinal axis, arranged laterally and parallel to said feed screw element, and configured to receive and support a further portion of said packs along said braking path;

said feed screw element and said further feed screw element defining between them said braking path.

10. The feeding unit as claimed in claim 1, and further comprising a braking unit arranged upstream of said feed screw device and of said braking path, with respect to a direction of advancement of said packs from said inlet region to said outlet region, and configured to slow down said packs along a slowing path, so that said packs are kept in contact with said at least one carrying element at said outlet region;

and wherein said braking unit comprises an additional feed screw device.

11. The feeding unit as claimed in claim 10, wherein said additional feed screw device comprises at least one additional feed screw element rotatable about its own longitudinal axis and having an additional outer thread wound around said longitudinal axis and configured to receive and support said portion along said slowing path.

12. The feeding unit as claimed in claim 11, wherein said additional feed screw device is driven by said feed screw device.

13. A packaging assembly configured to form, seal and fold a plurality of semi-finished packs containing a pourable product starting from a packaging material; said packaging assembly comprising:

a forming unit configured to form and seal a plurality of said packs;

a folding unit configured to fold said packs so as to obtain folded packages; and a feeding unit as claimed in claim 1 and configured to receive said packs from said forming unit and to feed said packs to said folding unit.

14. A feeding unit configured to feed semi-finished sealed packs containing a pourable product to a folding unit adapted to fold said packs so as to obtain folded packages, said feeding unit comprising:

a conveyor device having at least one carrying element configured to advance said packs from an inlet region of said feeding unit to an outlet region of said feeding unit;

a feed screw device arranged at said outlet region and configured to receive and support said packs from said conveyor device, to advance said packs along a braking path and to feed said packs to said folding unit, wherein said feed screw device being configured to decrease the velocity of said packs along said braking path, and a braking unit comprising a plurality of movable braking elements and arranged upstream of the feed screw device, said braking device configured to decrease the velocity of said packs along a slowing path such that said packs are kept in contact with said at least one carrying element.

* * * * *